No. 859,225. PATENTED JULY 9, 1907.
R. G. HOWARD.
CHANGEABLE EXHIBITOR.
APPLICATION FILED JAN. 3, 1906. RENEWED DEC. 21, 1906.
2 SHEETS—SHEET 1.
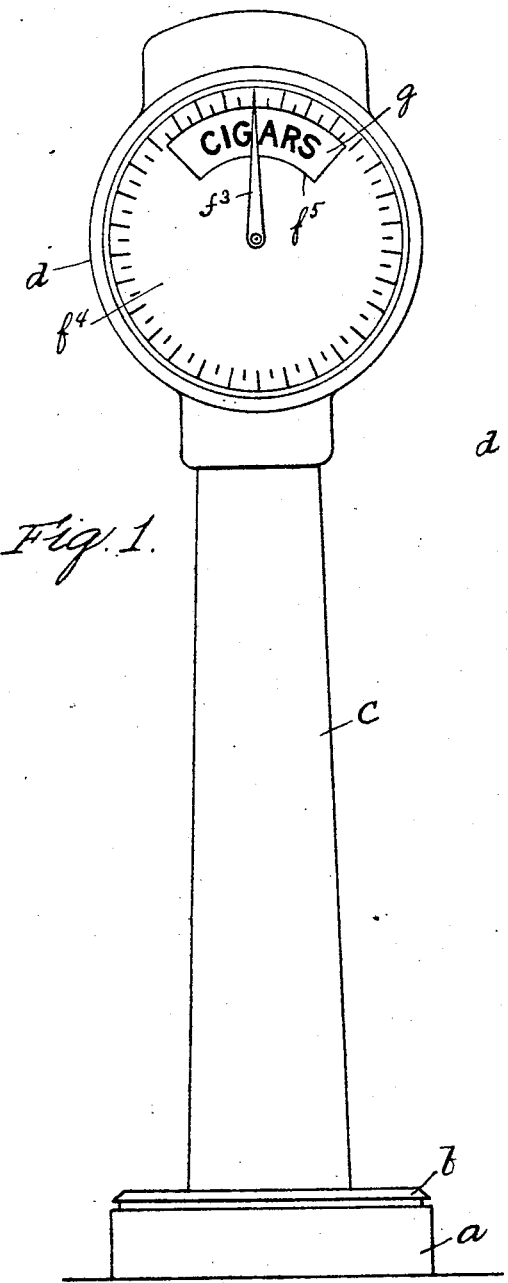
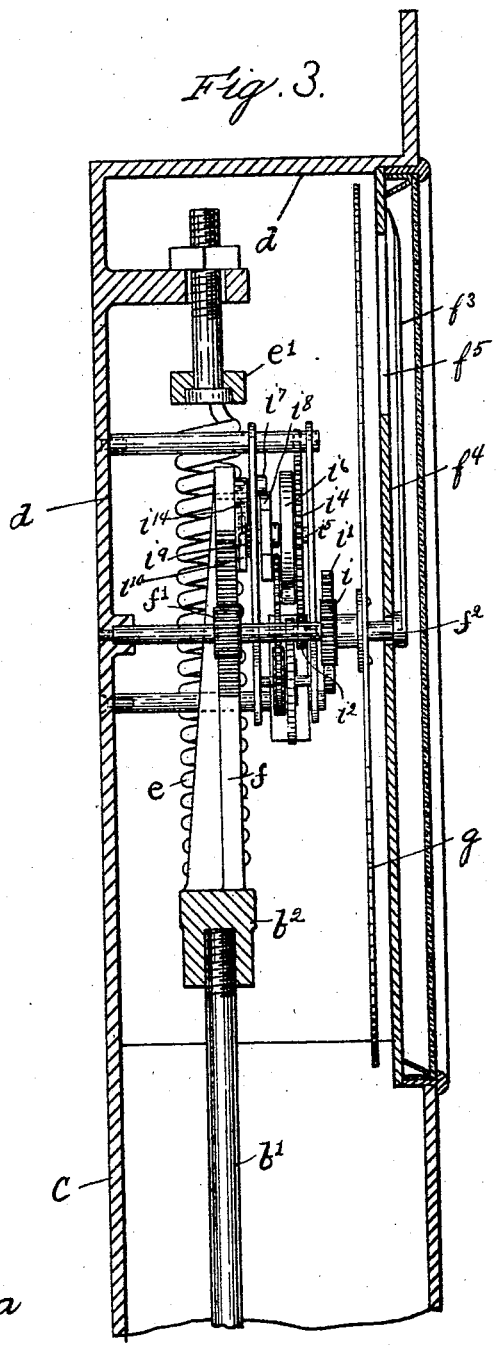
Witnesses:
H. B. Davis.
Cynthia Doyle.
Inventor;
Robert G. Howard
by Noyes & Hanniman
attys

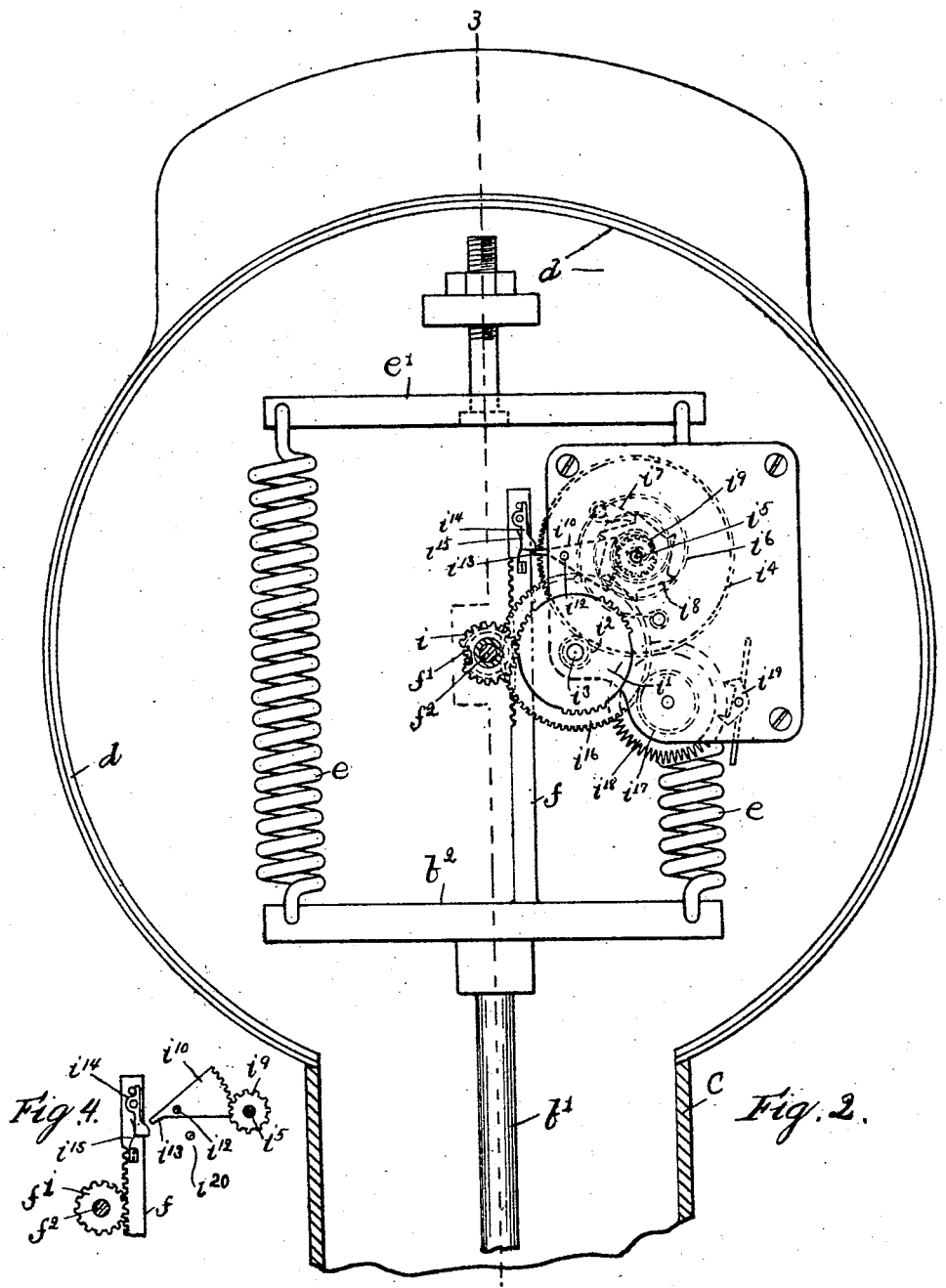

ated January 3, 1906. Renewed December 21, 1906. Serial No. 348,874.

UNITED STATES PATENT OFFICE.

ROBERT G. HOWARD, OF NEWTON, MASSACHUSETTS.

CHANGEABLE EXHIBITOR.

No. 859,225. Specification of Letters Patent. Patented July 9, 1907.

Application filed January 3, 1906. Renewed December 21, 1906. Serial No. 348,874.

*To all whom it may concern:*

Be it known that I, ROBERT G. HOWARD, of Newton, county of Middlesex, State of Massachusetts, have invented an Improvement in Changeable Exhibitors, of which the following description, in connection with the accompanying drawings, is a specification, like characters on the drawings representing like parts.

This invention relates to changeable exhibitors, and has for its object to construct a changeable exhibitor adapted to be applied to a weighing machine, the operation of which is controlled by the movable platform of said machine, to bring different exhibits or advertisements to view, or to display one or more different exhibits or advertisements each time the platform is depressed.

My invention comprehends the employment of a spring actuated motor for operating the changeable exhibitor, which is adapted to be wound and also released and permitted to operate by depressing the platform of the weighing machine; and also comprehends the employment of a motor which is adapted to move the changeable exhibitor intermittently so as to display several exhibits or advertisements each time it is permitted to operate.

Figure 1 shows in front elevation a changeable exhibitor embodying this invention, applied to a weighing machine of ordinary construction. Fig. 2 is an enlarged front elevation of the head of the machine, the dial-plate and exhibiting-disk being removed to expose the operating parts. Fig. 3 is a vertical section of the head shown in Fig. 2, taken on the dotted line 3—3. Fig. 4 is a detail to be referred to.

$a$ represents the base of the machine; $b$ the movable platform, $c$ a column rising from the base $a$ which contains the platform rod $b'$, and $d$ the circular or other shaped head which is mounted on the column $c$ and which contains the operating parts. The platform rod $b'$ is connected at its upper end to a frame-plate $b^2$ to which the lower ends of the weighing springs $e$, $e$, are attached and the upper ends of said springs are attached to a cross-bar $e'$, which is adjustably supported at the top of the head $d$. A rack-bar $f$ is formed upon or erected on the frame-plate $b^2$, which extends upward, and its teeth engage a pinion $f^x$ secured to a shaft $f^2$ having its bearings centrally disposed in the head $d$.

An indicating hand or pointer $f^3$ is secured to the shaft $f^2$, which moves over a dial-plate $f^4$, set in front of the head $d$, said indicating hand and dial-plate constituting the indicating device, for indicating the weight.

The mechanism thus far described is common in weighing machines, and is herein shown merely for the sake of illustrating my invention; and I desire it to be understood that my invention comprehends the employment of any other equivalent form of weighing mechanism by which the weight of a person standing on the movable platform may be indicated, or any other form of spring supported or spring balanced or movable platform which is adapted to be depressed by the weight of a person standing upon it.

The exhibiting-device consists essentially of a disk $g$, loosely mounted on the shaft $f^2$, back of the dial-plate $f^4$, said disk having secured to or printed upon or otherwise provided thereon any number of exhibits or advertisements. These several exhibits or printed advertisements are displayed through an opening $f^5$ in the dial-plate $f^4$. A pinion $i$ is secured to or rigidly connected with the exhibiting-disk g, which is engaged by a mutilated gear $i'$ adapted to be rotated by any suitable motor, and as herein shown said mutilated gear has three series or groups of teeth, and consequently three spaces, which are devoid of teeth, and each toothed portion of the gear is adapted to revolve the pinion $i$ one-quarter of a revolution, so that during each complete revolution of the gear $i'$ the pinion $i$ will be rotated three-fourths of a revolution. The exhibiting-disk $g$ will be provided with four advertisements of exhibits, hence three of them will be displayed successively during each complete revolution of said gear $i'$, which results in a different exhibit or advertisement being left exposed or displayed at the end of each complete revolution of the gear $i'$. The motor is adapted to turn the gear $i'$ one complete revolution during each operation thereof, and, as herein shown, said motor consists of a pinion $i^2$ secured to the shaft $i^3$ bearing the mutilated gear $i'$, a driving gear $i^4$ engaging said pinion, which is loosely mounted on the main shaft $i^5$ and has attached to it one end of an actuating spring $i^6$, the other end of said spring being attached to said main shaft $i^5$, and a pawl $i^7$ is mounted on said gear $i^4$, which engages a ratchet toothed wheel $i^8$ secured to the main shaft $i^5$, and a pinion $i^9$ is secured to said main shaft which is engaged by a toothed sector $i^{10}$, pivoted at $i^{12}$, and having a laterally extended engaging portion $i^{13}$, which projects beneath a dog $i^{14}$, pivoted to the rack-bar $f$, and held in normal position against a fixed stop on said rack-bar by a spring $i^{15}$. A toothed gear $i^{16}$ is also secured to the shaft $i^3$ bearing the mutilated gear $i'$, which engages a pinion $i^{17}$ secured to a shaft bearing an escape-wheel $i^{18}$ with which coöperates a suitable pallet $i^{19}$. When the rack-bar $f$ is drawn down, as it will be by a person standing on the platform, the indicating hand of the indicating-device will be moved over the dial to indicate the weight, and the dog $i^{14}$ will move the toothed sector $i^{10}$ to wind the motor. The movement of the rack-bar, however, is sufficient for the dog to not only move the motor $i^{10}$ to wind the motor, but also to disengage said sector, thereby permitting the motor or spring actuated train to operate. Therefore, while the person is standing on the platform obtaining his weight, the exhibiting-device will be operated, and three exhibits or advertisements will be displayed, or any other number that the apparatus may be arranged for. As the person steps from the platform the rack-bar $f$ resumes its normal position, and the dog $i^{14}$ passes by and engages the engaging-portion of the toothed-sector preparatory to again operating it when another person steps upon the platform. If the person stands on the platform an undue length of time the toothed-sector will return to its normal position as soon as the motor runs down, striking against a stop $i^{20}$, and being held by said stop until the rack-bar bearing the dog returns to its normal position.

The form of exhibiting-device herein shown is simple and capable of displaying quite a number of exhibits or advertisements, but I desire it to be understood that my invention comprehends the employment of any other form of exhibiting-device in lieu of the form herein shown, and furthermore my invention comprehends the employment of any other form of motor-mechanism for operating the exhibiting-device which is adapted to be wound and thereafter released by depressing the platform.

Having thus described my invention, what I claim as new and desire to secure by Letters Patent is:—

1. In a changeable exhibitor, the combination of an indicating-device, a platform, weighing-springs, means connecting said weighing-springs and said indicating-device with said platform, an exhibiting-device located back of a display opening in the exhibitor having a plurality of exhibits, a spring-actuated motor for operating said exhibiting-device to successively present the exhibits to view at said display opening, and means, connected with and operated by said platform, for controlling the operation of said motor, substantially as described.

2. In a changeable exhibitor, the combination of an indicating-device, a platform, weighing-springs, means connecting said weighing-springs and said indicating-device with said platform, an exhibiting-device, a motor for operating said exhibiting-device, and means, connected with and operated by said platform, for winding and releasing said motor, substantially as described.

3. In a changeable exhibitor, the combination of an indicating-device, a platform, weighing-springs, means connecting said weighing-springs and said indicating-device with said platform, an exhibiting-device, a motor for repeatedly operating said exhibiting-device each time it operates, and means, connected with and operated by said platform, for controlling the operation of said motor, substantially as described.

4. In a changeable exhibitor, the combination of an indicating-device, a platform, weighing-springs and means connecting said weighing-springs and said indicating-device with said platform, a rotating exhibiting-disk, a spring-actuated motor for rotating it, and means, connected with and operated by said platform, for controlling the operation of said motor, substantially as described.

5. In a changeable exhibitor, the combination of an indicating-device, a platform, weighing-springs, and means connecting said weighing-springs and said indicating-device with said platform, a rotating exhibiting-disk, a spring-actuated motor for rotating it intermittingly each time it operates, and means, connected with and operated by said platform, for controlling the operation of said motor, substantially as described.

6. In a changeable exhibitor, the combination of a dial having a display opening, and an indicating-hand, a platform, weighing-springs, and means connecting said weighing-springs and said indicating-hand with said platform, a rotating exhibiting-disk back of said dial, a spring-actuated motor for rotating said disk and means, connected with and operated by said platform, for controlling the operation of said motor, substantially as described.

7. In a changeable exhibitor, the combination of an indicating-device, a platform, weighing-springs, and means connecting said weighing-springs and said indicating-device with said platform, a rotating exhibiting-disk, a pinion secured to its shaft, a mutilated gear engaging said pinion, and a motor for revolving said gear, the operation of which is controlled by said platform, substantially as described.

8. In a changeable exhibitor, the combination with weighing-mechanism and a movable platform to which it is connected, of a face plate having a display opening, of an exhibiting device located back of said display opening having a plurality of exhibits, a spring actuated motor for operating said exhibiting device to successively present the exhibits to view at said display opening, and means connected with and operated by said platform for controlling the operation of said motor, substantially as described.

9. In a changeable exhibitor, the combination with weighing-mechanism and a movable platform to which it is connected, of an exhibiting-device located back of a display opening in the exhibitor having a plurality of exhibits, a motor for repeatedly operating said exhibiting device each time it operates, and means, operated by said platform for controlling the operation of said motor, substantially as described.

10. In a changeable exhibitor, the combination with weighing-mechanism and a movable platform to which it is connected, of a rotating exhibiting disk located back of a display opening in the exhibitor having a plurality of exhibits, a spring actuated motor for rotating it, and means, operated by the platform for controlling the operation of said motor, substantially as described.

In testimony whereof, I have signed my name to this specification, in the presence of two subscribing witnesses.

ROBERT G. HOWARD.

Witnesses:
B. J. NOYES,
H. B. DAVIS.